United States Patent [19]

Monaghan

[11] 3,995,665
[45] Dec. 7, 1976

[54] THERMAL INSULATION ELEMENT

[75] Inventor: George J. Monaghan, Niagara Falls, N.Y.

[73] Assignee: The Carborundum Company, Niagara Falls, N.Y.

[22] Filed: May 28, 1974

[21] Appl. No.: 473,624

[52] U.S. Cl. .......................... 138/147; 138/DIG. 2
[51] Int. Cl.² .......................................... F16L 9/14
[58] Field of Search .......... 138/140, 147, 149, 178, 138/DIG. 2

[56] References Cited
UNITED STATES PATENTS

| 262,429 | 8/1882 | Johns | 138/149 |
|---------|--------|-------|---------|
| 312,037 | 2/1885 | Suhr | 138/149 |
| 1,661,254 | 3/1928 | Gillies | 138/147 |
| 2,614,585 | 10/1952 | Wagstaff | 138/140 |
| 2,778,759 | 1/1957 | Stephens et al. | 138/147 X |
| 3,222,777 | 12/1965 | Rutter et al. | 138/147 X |
| 3,451,661 | 6/1969 | Barker | 138/149 X |
| 3,620,258 | 11/1971 | Graham | 138/149 X |
| 3,881,864 | 5/1975 | Nicol | 138/147 X |

FOREIGN PATENTS OR APPLICATIONS 740,496  11/1955  United Kingdom .............. 138/140

Primary Examiner—Richard C. Queisser
Assistant Examiner—Charles Gorenstein
Attorney, Agent, or Firm—David E. Dougherty; Raymond W. Green

[57] ABSTRACT

An insulation covering for the protection of cylindrical bodies exposed to high thermal and mechanical stresses is provided by the assembly of flexible resilient ring shaped insulation elements, the elements being comprised of fibrous refractory materials such as aluminum silicate, silica, alumina or glass. The insulation elements are assembled in a stacked array and are then compressed between rigid, or adjustable metal bands, to give a firm body of insulation which surrounds and protects the enclosed cylindrical body. One side of the ring shaped insulation elements may be severed to allow opening the insulation elements for installation around the cylindrical body, this modification being employed when the insulation elements cannot be placed over one of the ends of the body.

6 Claims, 8 Drawing Figures

THERMAL INSULATION ELEMENT

BACKGROUND OF THE INVENTION

In the preparation of steel, steel ingots are first heated to a uniform temperature and then rolled into various shapes such as billets, slabs, blooms, etc. The once rolled ingots are then reheated for further rolling. An important application for the present invention concerns the furnace in which the shaped ingots are further heated. While this type of furnace may take many different forms, it will be referred to hereinafter, generically, as a "slab reheating furnace" and the invention will be discussed with respect to a shaped ingot in the form of a slab.

The slabs move through the furnace on horizontal water cooled pipes known as skid rails which are supported from below by horizontal and vertical water cooled steel support tubes. Because it is essential that the slabs be heated uniformly, burners must be provided both above and below the level of the slabs. However, this necessitates placement of the skid rails and support tubes in the path of the hot oxidizing gases emanating from the lower burner. Thus, the immense weight of the slabs and the high temperature of the gases in the furnace place great demands upon the skid rails and the support tubes.

Clearly, the skid rails and the support tubes must be protected by sufficient insulating material to minimize the flow of heat from the interior of the furnace to the water cooled tubes. Such heat flow would reduce the operating efficiency of the furnace for at least two reasons. First it would draw off otherwise useful furnace heat, and second it would place a greater burden on the system which cools and supplies water to the water cooled tubular support members.

Conditions within the furnace place strong demands on the construction and design of the protecting and insulating material. High temperature, large temperature gradients, extreme mechanical shocks (caused by irregular or bouncing movement of the slabs along the skid rails) and the piercing effect of falling pieces of slag require that the protecting and insulating material (1) must be very thick and/or (2) must be either constituted by or at least protected by strong refractory material. It might be relatively simple to provide an adequate protecting and insulating layer on the skid rails and support tubes if no restrictions were placed upon the overall diameter of the protecting and insulating layer. However, as noted above, these tubular support members are located in the path of the hot gases between the lower burner and the slabs, as a result of which the tubular support members tend to shield or shadow the bottoms of the slabs from the heat generated by the lower burner. The effect of shadowing is to rob the lower portion of the furnace of valuable combustion space and thereby produce an uneven temperature distribution through the slab. As one manifestation of this problem, the temperature of the slabs is generally lower along the lines where the skid rails physically contact and thereby shadow the bottoms of the slabs.

As noted above, however, it is essential that the slabs be heated uniformly. Consequently, to lessen the effect of shadowing, the overall diameter of the skid rails and the support tubes, including the inner and outer protecting and insulating layers, should be kept as small as possible.

Finally, the solution to the various problems outlined above must be an economical one. To be economical, an insulating and protecting arrangement for a tubular support member must be durable (so that replacement is required only infrequently), it should maintain its structural integrity between replacements (so that furnace efficiency is not reduced for long periods between replacements) and it should be capable of easy and rapid replacement (thereby minimizing furnace shut down time).

The task of designing a truly improved skid rail and support tube protecting and insulating arrangement is complicated by the fact that the obvious solution to one problem tends to be contrary to the obvious solution to another problem. For example, good heat retention in the furnace requires a thick insulation but this only increases the detrimental effect of shadowing. The prior art to date is composed mainly of compromise solutions which have solved some of the problems, either to the detriment of, or while ignoring the other problems.

An early attempt to provide a suitable heat barrier between the furnace and the water cooled tubes included surrounding the tube with a layer formed by a plurality of large, rigid sections formed of a refractory material, leaving a space between the tube and the inner surface of the refractory layer. An example of this arrangement is shown in the Schmidt U.S. Pat. No. 2,436,452. However, this arrangement requires that the large sections (1) be mounted on studs or other mounting members in direct heat transfer relationship with the tube and (2) be rigidly held to each other. Because of the tight rigid fit between the sections, the refractory layer cannot yield so as to withstand the intense vibrational shocks caused by movement of the slabs; and because of the discrepancy in heat flow characteristics between the studs and the refractory material, large thermal gradients are established and these in turn cause thermal stresses. The effect of the vibrational shocks and the thermal stresses is to cause cracking of the large section. On the other hand, it is not always feasible to eliminate the tight fit between the sections since this would create air spaces between the sections for the flow of heat and gases from the furnace to the water cooled tube. Moreover, because the gases in the furnace are oxidizing in nature, they tend to corrode the tube. Another disadvantage of the large sections is that they are normally held together in a complex arrangement, thereby rendering replacement of a single section quite difficult without replacing the entire layer.

In another prior art arrangement, the large sections are replaced by a one-piece refractory layer molded directly onto the tube and held in place by suitable means, such as a wire mesh welded to the tube. An example of this arrangement is shown in the U.S. Pat. No. 2,693,352 to Bloom. This arrangement does not eliminate the cracks derived from thermal stresses and vibrational shocks. It does provide the advantage that at least the pieces are held in place on the tube for a longer period of time by the wire mesh. However, the molding approach creates a problem since the replacement time for molding a layer of refractory material would be relatively long, thereby increasing down time of the furnace.

Still another prior art approach includes arranging a plurality of sectional refractory elements partially circumferentially about the water cooled tube, holding the sections in place with mounting elements connected to the tube and with tongue and groove connections between the sections, and placing a layer of ceramic fiber insulating material in the annular space between the refractory layer and the tube. A circumferential gap is left between the last two elements and this gap is closed with a refractory mortar. Such an arrangement is shown, for example, in U.S. Pat. No. 3,226,101 to Balaz. However, this arrangement would apparently suffer from the same disadvantages as the earlier approaches which employed direct heat flow passages in the form of mounting means between the furnace and the water cooled tube. Moreover, if the refractory elements are held tightly together, it would appear that this arrangement would not accommodate the vibrational shocks caused by movement of the slab along the rails. On the other hand, as noted earlier, if the refractory elements are not held tightly together, additional passages would be provided between the sections for heat loss and for the flow of corrosive gases from the furnace to the metal tube. The mortar closure usually lacks durability, and the service life of this arrangement often leaves much to be desired.

Another modification of insulation is shown in U.S. Pat. No. 3,451,661 to Barker. This describes an inner layer of resilient insulating material which is held in place by an outer layer of interlocking refractory elements. While a resilient inner body of insulation is provided by this method, the outer layer elements are of rigid material and subject to breakage, while their assembly is somewhat complicated and time consuming. In this type of furnace the insulation must withstand the combination of high thermal and mechanical stresses and yet should permit rapid installation and repair; the insulation arrangements proposed so far have not been entirely satisfactory in these regards.

SUMMARY OF THE INVENTION

The invention provides a fibrous resilient thermal insulating material in the form of a ring shaped insulation element for insulating cylindrical bodies. The ring shaped insulation element may be split or severed on one side for easier installation, and the fibers may comprise refractory material such as aluminum silicate, silica, alumina, or glass. The insulation ring elements are placed around the cylindrical body and are preferably compressed in an annular direction to compact them firmly, the resulting body of insulation being held in position by suitable refractory retaining rings. Adjustable metal bands may also be used as an alternate means for retaining the insulation body.

DESCRIPTION OF THE PREFERRED EMBODIMENTS

Figure 1:
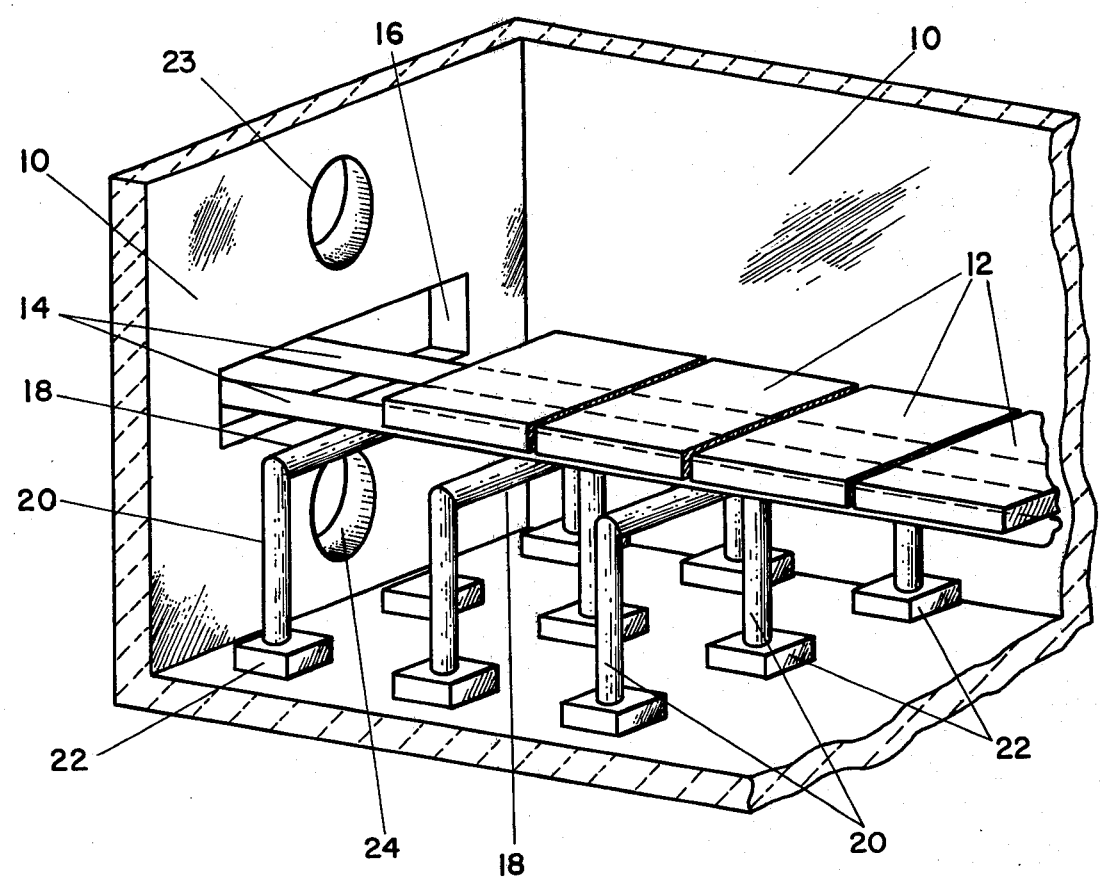
FIG. 1 shows a schematic interior view of a slab reheating furnace.

The insulation materials of the invention may be employed in many types of high temperature applications, one of the most important being the insulation of water cooled support tubes as used in a slab reheating furnace. Part of the interior of a furnace of this type is shown in FIG. 1. The furnace comprises refractory walls 10 which enclose a high temperature chamber through which heavy metal slabs 12 are moved on metal skid rails 14. The slabs are introduced at an inlet opening, not shown, and discharged through a suitable outlet such as opening 16. The skid rails 14 are supported on horizontal water cooled support tubes 18, which are in turn supported by vertical water cooled support tubes 20, the latter extending from the support tubes 18 to pedestals 22. FIG. 1 also illustrates, schematically, the relative positions of an upper burner at upper opening 23 and a lower burner at lower opening 24. It can be seen that the skid rail support tubes 18 and 20 stand in the path of the hot gases generated by the lower burner at lower opening 24. It is apparent, therefore, that any insulation means used on the support tubes 18 and 20 must not only be capable of withstanding the mechanical shocks transmitted to the support tubes from movement of the slabs upon the skid rails, but must also maintain its integrity in spite of the direct exposure to the disruptive effects of the hot blast of burner gases.

Figure 2:
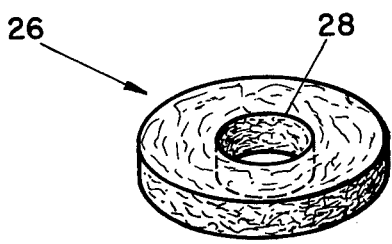
FIG. 2 shows a schematic view of the insulation ring element of the invention.

A ring shaped element of thermal insulation, as provided by the invention for the insulation of cylindrical bodies, is shown schematically in FIG. 2, the ring shaped insulation element generally indicated at 26. The insulation element 26 is formed from resilient flexible fibrous material which may comprise refractory material such as aluminum silicate, silica, alumina, glass or the like. A preferred fibrous material comprises aluminum silicate, which may be used at temperatures up to 2600° F. This material is manufactured by the Carborundum Company under the trademark FIBERFRAX H and is eminently suitable for high temperature insulation application. The fibrous material may be in the form of a non-woven felt and may be needled if desired to increase its strength. The insulation ring element 26 is formed with an axial opening 28, this opening passing completely through the element and an inner diameter corresponding to the outer diameter of the cylindrical body which is to be insulated. The insulation ring element 26 may be made of any practical thickness and outer diameter, however, a preferred thickness is about one inch with a radial distance between the internal diameter of the opening 28 and the outer diameter of the ring 26 of preferably about 2 inches.

Figure 3:
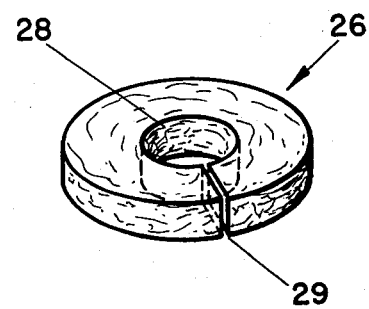
FIG. 3 shows a schematic view of the insulation ring element of the invention, cut or severed on one side.
Figure 4:
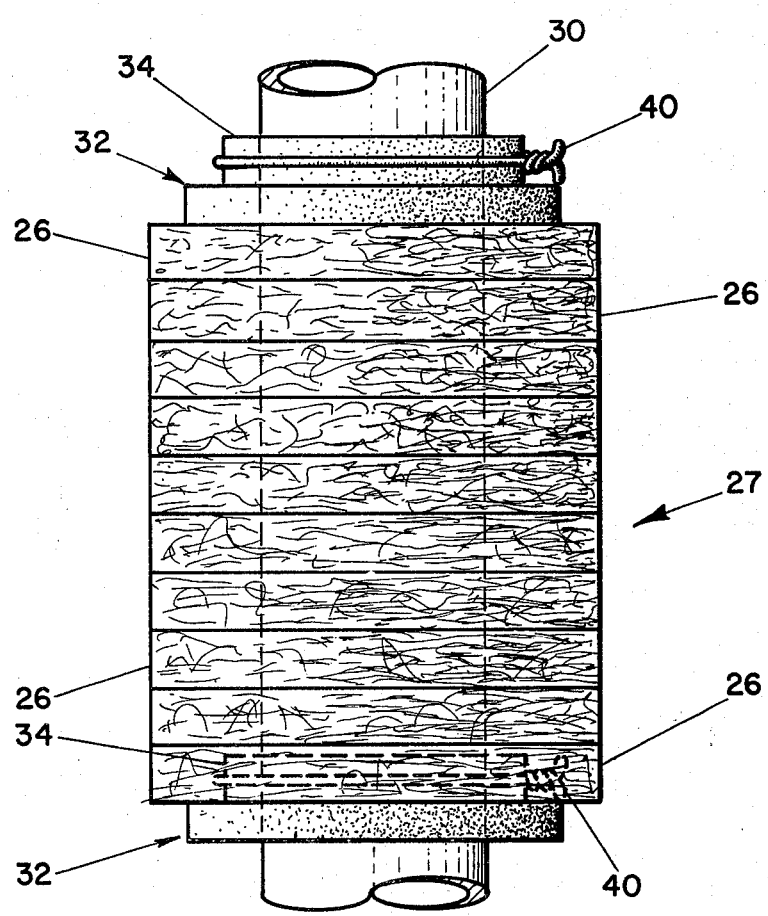
FIG. 4 shows a side view of the insulation assembly.

Although the preferred shape of the insulation ring element 26 is that shown in FIGS. 2 and 3 as having a circular axial opening 28 and a circular outer periphery, most particularly preferably having a cut 29 as shown in FIG. 3, the insulation ring element is not limited to this shape alone. The axial opening may be oval or square shaped, depending on the configuration of the object to be insulated, and the outer periphery of the ring may be correspondingly shaped as desired. An insulation assembly formed from these elements may be applied to any elongated body; the preferred application is to cylindrical tubular bodies, such as pipes which may contain fluids. Such an application is shown in FIG. 4, which illustrates an assembly of insulation shown generally as 27, built up from a plurality of insulation ring elements 26 in stacked array, surrounding and insulating the tube 30.

Figure 5:
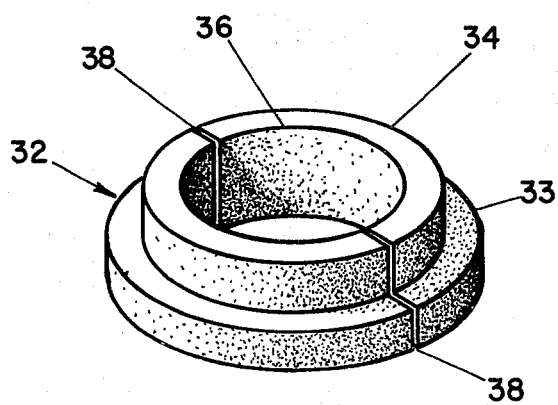
FIG. 5 shows a schematic view of an insulation retainer ring.
Figure 6:
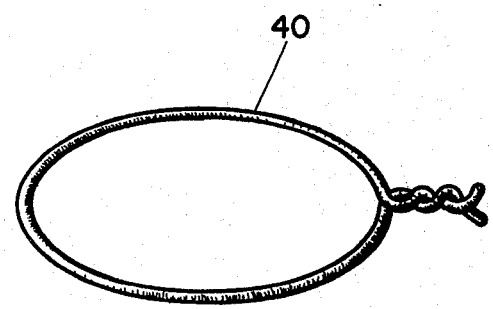
FIG. 6 shows a wire lock for the retainer ring of FIG. 5.

The insulation assembly 27 is supported at both ends by ceramic retainer rings 32. One of the retainer rings 32 is shown in greater detail in FIG. 5, the retainer ring being formed of a rigid refractory material such as vacuum formed aluminum silicate, alumina, silica, magnesia or the like. The ring has a raised concentric shoulder portion 34, the shoulder surrounding an opening 36, extending through the center of the ring. This opening is preferably circular in shape and has an inner diameter corresponding to the outer diameter of the cylindrical body which is to be insulated. The outer periphery 33 of the retainer ring 32 has a diameter which is preferably slightly less than the outer diameter of the insulation ring element which it is to support. Two cuts 38 are made through the retainer ring to divide it into two separate but equal half sections. The two half sections are then placed around the cylindrical tube 30 (FIG. 4) and the half sections joined together and held in firm engagement around the tube by means of a twist wire lock 40. This wire lock is shown in FIG. 6, it is placed around the raised shoulder portions 34 of the two half sections of the ring 32. The wire is twisted tightly with pliers or a similar tool, this action drawing the two half sections together around the tube 30, thus gripping the tube firmly and forming a rigid end support for the insulation assembly 27. If desired, the wire lock 40 may be replaced by an adjustable metal band, a band of this type being shown as 44 in FIG. 7. As shown in FIG. 4, the first retainer ring 32 is assembled so that the raised shoulder portion 34 projects into the insulation ring element 26.

After the first retaining ring 32 is secured in place, the insulation assembly 27 is built up by placing insulation ring elements 26 over the tube 30 until the desired length of tube 30 is covered. The stacked assembly of resilient insulation ring elements is then pressed in an axial direction against the retainer ring 32, this ring supporting the end of the insulation assembly 27 so that the ring elements are equally compressed throughout the length of the insulation assembly 27. The degree of compression is not enough to make the assembly rigid, but rather is applied to densify the resilient insulation ring elements 26 to some extent, and thereby virtually eliminate the penetration of hot gases through the insulation. For example, a free standing assembly of insulation ring elements, about 16 inches high, may be compressed to a height of about 12 inches. This degree of compression results in an insulation assembly which has highly satisfactory insulating properties and yet retains sufficient resilience to resist mechanical shocks.

The insulation body is held under compression by the application of a second retainer ring 32 which is secured around the tube 30 in the same manner as previously described for the first retainer ring, except that the shoulder 34 of this second ring faces away from the insulation body 27. This is to permit the tightening of the wire lock 40. While the wire lock 40 is comprised of a heat and oxidation resistant metal, such as stainless steel or nichrome, it is preferred that the exposed wire lock be covered with a castable refractory mix which will rapidly harden in service, thereby protecting the wire from exposure to the hot furnace gases.

Figure 8:
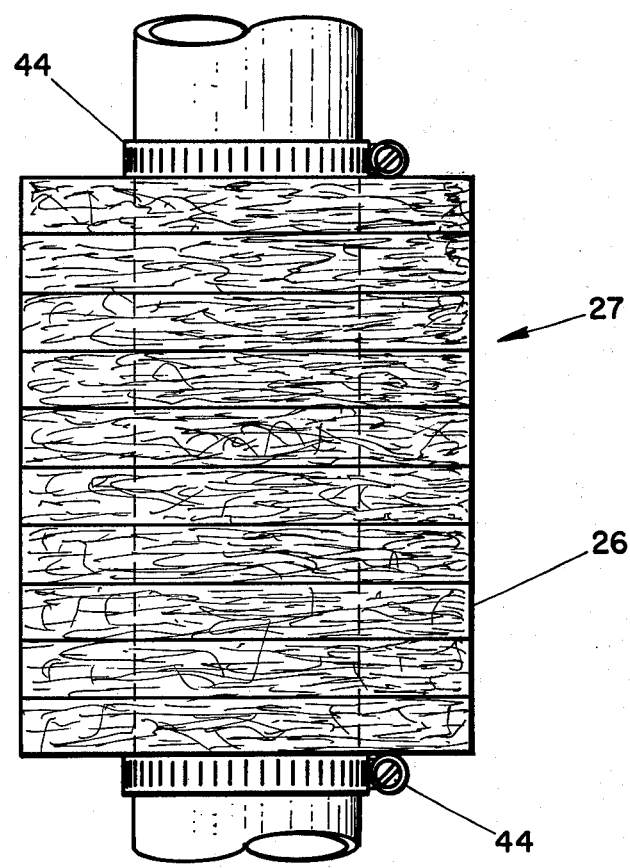
FIG. 8 shows a body of insulation held in position by adjustable metal clamps.
Figure 7:
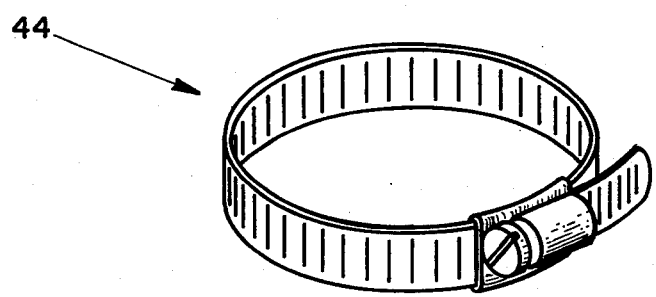
FIG. 7 shows an adjustable metal clamp suitable as an alternate retainer means.

The use of refractory retaining rings, secured by wire locks or metal bands, has been described as the preferred means for supporting the insulating body 27 of the invention. The invention is not limited to this type of support means, however, since the insulating body 27 may, if desired, be supported only by adjustable metal bands, such as that shown generally at 44 (FIG. 7). These are clamped around the body to be insulated and supports both ends of the assembled and compressed body of insulation 27, as shown in FIG. 8. The adjustable bands should be comprised of a heat and oxidation resistant metal, such as stainless steel. After installation, the bands are preferably covered with a castable refractory mix which will rapidly harden in service, thereby protecting the bands from exposure to the hot furnace gases.

The use of the insulation ring elements of the invention has been described for applications which permit the use of unbroken ring elements of insulation which can be slipped over one end of the body to be insulated. In most applications however, the insulation elements must be applied to bodies which are already installed in place with the ends secured to other members. The preferable form of insulation ring element 26 is therefore that shown in FIG. 3 in which one side of the insulation element is completely split or severed as shown at cut 29. Since the insulation element 26 is made of a flexible resilient material, the cut 29 permits a temporary opening of the insulation element to allow its ready positioning around the body to be insulated. Cuts 29 of adjacent insulation ring elements should preferably be staggered from one another as the insulation body is assembled. Cuts 29 of the insulation ring elements further be positioned to face away from the flow of hot gases, such as that existing in the furnace of FIG. 1, for example. Cutting the insulation ring elements has little effect upon their insulative properties, since the subsequent compression of the insulation assembly completely closes the severed ring element sections to give a firm compact covering of insulation.

The insulation assembly as described has many advantages over those previously used in high temperature applications. Installation is rapid, actual tests showing that three or four times as much insulation can be installed in less than one third of the time required to install a comparable hard refractory insulation. The tests have further shown the insulation assembly of the invention to have superior resistance to the effects of thermal and mechanical shock under furnace operating conditions, compared with other insulating materials previously used. The insulation ring elements of the invention have the further advantage of being readily replaceable if repairs become necessary, since damage to one part of the assembled insulation body may often be remedied by the replacement of only a few of the component rings while the rest of the insulation body may be continued in service. Since the insulation ring elements are made of flexible resilient material, they easily withstand mechanical shocks which are transmitted through the insulated body. The fibrous nature of the insulating material also results in a greatly reduced rate of heat transfer. In comparing other systems with one using the insulation ring elements of the invention, the following observation was noted in an actual furnace installation. A saving of 23 cents per ton or approximately $11,000 per month in gas fuel resulted by using the insulation ring elements of the invention with a K value of 0.8 BTU/IN/HR/FT$^2$/° E in place of a competitive system using a hard refractory with a K value of 10 BTU/IN/HR/FT$^2$/° F. Because fuel is short in supply, fuel savings become one of the most important advantages the insulation ring elements of the invention can offer. To illustrate the reduction in heat loss, experience has shown that in a furnace such as shown in FIG. 1, the incoming water temperature in a bare cross-over pipe 18 is about 38° F, the exit water temperature increasing to about 70° F. If the pipe is insulated with the insulation ring elements of the invention, the exit water temperature is only 40° F, the flow rate of the cooling water being the same in each case.

I claim:

1. A thermal insulation assembly comprising at least one thermal insulation element for covering a cylindrical body, the element being resilient, flexible refractory fibrous material stable at temperatures up to 2600° F, consisting of fiber selected from the group consisting of aluminum silicate, silica, alumina and glass; in which one side of said ring shaped insulation element is severed; the assembly being held in compression around said cylindrical body by a retaining means comprising retaining rings of rigid refractory material at both ends of the assembly.

2. A thermal insulation assembly according to claim 1, wherein said thermal insulation elements are axially compressed at least to an extent as to occupy 75% of the free standing height of said elements.

3. A thermal insulation assembly according to claim 1, in which the retaining rings comprise refractory materials selected from the group consisting of aluminum silicate, alumina, silica and magnesia.

4. A thermal insulation assembly comprising at least one thermal insulation element for covering a cylindrical body the element being resilient, flexible refractory fibrous material stable at temperatures up to 2600° F, consisting of fiber selected from the group consisting of aluminum silicate, silica, alumina and glass; in which one side of said ring shaped insulation element is severed; the assembly being held in compression around said cylindrical body by a retaining means comprising at least one adjustable metal band.

5. A method for thermally insulating a cylindrical body, comprising the steps of:
   a. forming a plurality of resilient, flexible ring-shaped insulating elements of refractory fibrous materials stable at temperatures up to 2600° F, consisting of fibers selected from the group consisting of aluminum silicate, silica, alumina and glass; in which one side of said ring-shaped insulation element is severed;
   b. placing a sufficient number of said ring-shaped insulation elements around said cylindrical body to thermally insulate the body;
   c. compressing said ring-shaped insulation elements in an axial direction after placing said ring-shaped insulation elements around said cylindrical body; and
   d. securing said elements under compression by a retaining means comprising retaining rings of rigid refractory material at both ends of the assembly.

6. A method for thermally insulating a cylindrical body, comprising the steps of:
   a. forming a plurality of resilient, flexible ring-shaped insulating elements of refractory fibrous materials stable at temperatures up to 2600° F, consisting of fibers selected from the group consisting of aluminum silicate, silica, alumina and glass; in which one side of said ring-shaped insulation element is severed;
   b. placing a sufficient number of said ring-shaped insulation elements around said cylindrical body to thermally insulate the body;
   c. compressing said ring-shaped insulation elements in an axial direction after placing said ring-shaped insulation elements around said cylindrical body; and
   d. securing said elements under compression by a retaining means comprising at least one adjustable metal band.

* * * * *